United States Patent
Valente et al.

(10) Patent No.: US 11,831,527 B2
(45) Date of Patent: Nov. 28, 2023

(54) METHOD FOR DETECTING ANOMALIES IN TIME SERIES DATA PRODUCED BY DEVICES OF AN INFRASTRUCTURE IN A NETWORK

(71) Applicant: Nozomi Networks Sagl, Mendrisio (CH)

(72) Inventors: Alessandro Valente, Como (IT); Alessandro Zamberletti, Luxembourg (LU); Moreno Carullo, Gavirate (IT)

(73) Assignee: Nozomi Networks Sagl, Mendrisio (CH)

( * ) Notice: Subject to any disclaimer, the term of this patent is extended or adjusted under 35 U.S.C. 154(b) by 0 days.

(21) Appl. No.: 17/690,676

(22) Filed: Mar. 9, 2022

(65) Prior Publication Data

US 2023/0291668 A1    Sep. 14, 2023

(51) Int. Cl.
*H04L 43/067* (2022.01)
*H04L 43/0823* (2022.01)
*H04L 43/0817* (2022.01)
*H04L 43/0864* (2022.01)

(52) U.S. Cl.
CPC ........ *H04L 43/0817* (2013.01); *H04L 43/067* (2013.01); *H04L 43/0847* (2013.01); *H04L 43/0864* (2013.01)

(58) Field of Classification Search
None
See application file for complete search history.

(56) References Cited

U.S. PATENT DOCUMENTS

| | | | | |
|---|---|---|---|---|
| 2020/0387797 A1* | 12/2020 | Ryan | ...................... | G06N 3/084 |
| 2021/0110262 A1* | 4/2021 | Schmitt | .................... | G06N 3/08 |
| 2022/0058174 A1* | 2/2022 | Lemberg | ............. | G06F 11/3075 |
| 2022/0179406 A1* | 6/2022 | Zope | .................. | G05B 23/0221 |

FOREIGN PATENT DOCUMENTS

CN    111312329 A    *    6/2020    ........... G06N 3/0454

OTHER PUBLICATIONS

Author: Carreon et al. Title: Statistical Time-based Intrusion Detection in Embedded Systems (Year: 2020).*
Author: Wen et al. Title: Time Series Anomaly Detection Using Convolutional Neural Networks and Transfer Learning (Year: 2019).*

* cited by examiner

*Primary Examiner* — John A Follansbee
*Assistant Examiner* — Kamal M Hossain
(74) *Attorney, Agent, or Firm* — Jason L DeFrancesco

(57) ABSTRACT

The present invention relates to a method for detecting anomalies in time series data produced by devices of an infrastructure in a network comprising, for each of the devices through computerized data processing means, retrieving a time series data for the device in the network, extracting a plurality of time series samples relating to respective time windows and having a predefined window size and a predefined stride, by sliding the time windows to overlap the time series data, supplying the time series samples as input to a Convolutional Autoencoder to define reconstructed time series values having a predefined percentile intervals, analysing the reconstructed time series values to identify anomalous behaviours of the time series data, signalling an anomaly of the device when at least one anomalous behaviour is identified.

12 Claims, No Drawings

METHOD FOR DETECTING ANOMALIES IN TIME SERIES DATA PRODUCED BY DEVICES OF AN INFRASTRUCTURE IN A NETWORK

FIELD OF INVENTION

The present invention relates to the field of security management of infrastructures, such as automation systems and industrial production systems. In particular, the present invention relates to a method for detecting anomalies in time series data produced by devices of an infrastructure in a network.

BACKGROUND ART

Security products of known type detect malicious attacks and sometimes are also able to take action to prevent them. The majority of intrusion prevention systems, or Intrusion Detection System (IDS), utilize one of detection methods between signature-based, statistical anomaly-based, and stateful protocol analysis. Signature-based DS monitors packets in the Network and compares with pre-configured and pre-determined attack patterns known as signatures. An IDS which is anomaly-based will monitor network traffic and compare it against an established baseline. The baseline will identify what is normal for that network. Finally, the stateful protocol analysis detection identifies deviations of protocol states by comparing observed events with pre-determined profiles of generally accepted definitions of benign activity.

Detecting anomalous behaviours in a network of computers is a complex but fundamental task for an IDS. With regards to Operational Technology (OT) networks, useful anomalies to be detected are when a device starts a communication with an unexpected protocol, which can be a symptom that the device under monitoring has been contacted by a malicious node inside the network that is performing a network scan or maybe just a configuration error. Moreover, useful anomalies to be detected are when a new function code is used inside a communication with a legit protocol. In this regard, a function code is an operation that an OT device support, wherein common operations are "read variable", "write variable", "start device", "stop device" or "update firmware". Some of these operations can be disruptive for the device itself and as a consequence for the process that the device serves. An unexpected function code sent to a device can be a symptom of an attacker trying to disrupt the device, a reconnaissance attempt or a misconfiguration.

An IDS with the ability to observe network traffic and decode protocols could implement a simple anomaly detection method with a two-phase approach, such as the approach described in the U.S. Pat. No. 10,955,831 B2.

In a learning phase the IDS will memorize all the protocols used between nodes and for every protocol will memorize all the function codes. Thus, with the learning phase all the memorized items will be marked as "learned" and interpreted as good, i.e., not considered anomalies. In a protecting phase the IDS will match any new items in the network (new communication between nodes or new function code in a communication) against the set of learned items and will raise an alert when a new item is not found which was not "learned", i.e., considered anomalies.

The aforementioned approach can be adapted to any kind of networks and does not require any previous knowledge but can be not well-suitable for networks comprising an increasing number of IoT or OT devices.

Due to the increasing, number of interconnections through the Internet of Things (IoT), enormous amounts of data are being generated. Real-time detection of anomalous behaviours in IoT and OT devices is of fundamental importance in the maintenance and surveillance of the systems to which those devices belong to. Being notified as soon as an abnormal behavior is detected allows for a faster and more efficient mitigation and prevention of incoming system failures and/or ongoing attacks, reducing or even nullifying the potential damages caused by those events.

Each IoT and/or OT device deployed in a particular system has its own peculiar behaviour and therefore must be individually analysed and monitored to provide an effective identification of its anomalies. Among all types of data, time series data (e.g., data from sensors) is becoming the most widespread. Unfortunately, collecting, storing, and analyzing massive amounts of this data is often not possible with traditional SQL databases. The challenge with time series data is that reads and writes to the database must be fast, reliable, and scalable.

It would therefore be desirable to have a method capable of detecting anomalies with the ability to identify abnormal behavior of IoT and/or OT devices in a real-time mode by making use of time series data.

BRIEF DESCRIPTION OF THE INVENTION

The object of the present invention is to provide a method for detecting anomalies in real-time mode. In particular, it would be desirable to provide a method for detecting anomalies of an infrastructure in a network able to recognize any malicious activity in a dynamic way.

According to the present invention is described, therefore, a method for detecting anomalies in time series data produced by devices of an infrastructure in a network.

The method comprises, for each of the devices:
  retrieving, by computerized data processing means, a time series data for the device in the network;
  extracting, by the computerized data processing means, a plurality of time series samples relating to respective time windows and having a predefined window size and a predefined stride, by sliding the time windows to overlap the time series data;
  supplying, by the computerized data processing means, the time series samples as input to a Convolutional Autoencoder to define reconstructed time series values having a predefined percentile intervals;
  analysing, by the computerized data processing means, the reconstructed time series values to identify anomalous behaviors of the time series data;
  signalling, by the computerized data processing means, an anomaly of the device when at least one anomalous behavior is identified.

In a further embodiment, the method further comprises normalising, through the computerized data processing means, the time series samples to define scaled time series samples before the supplying, and wherein in the supplying the time series samples are the scaled time series samples as input to a Convolutional Autoencoder.

In a further embodiment, the normalising comprises for each of the time series samples applying a different type of local scaling for the time series timestamps and for the time series values.

In a further embodiment, the local scaling for the time series timestamps is defined by a normal univariate scaling.

In a further embodiment, the local scaling for the time series values is defined by a max scaling.

In a further embodiment, the analysing comprising evaluating an actual overall loss of the Convolutional Autoencoder with respect to an actual retrieving time window identifying the anomalous behaviours of the time series data when the actual overall loss exceeds a predefined threshold level.

In a further embodiment, the predefined threshold level (τ) is defined in a learning phase with respect to a learning retrieving time window, as:

$$\tau = \mu + \frac{\sigma}{s}$$

wherein
- μ is the mean of the learning overall loss of the Convolutional Autoencoder;
- σ is the standard deviation of the learning overall loss;
- s is a predefined sensitivity level.

In a further embodiment, in the analysing when the anomalous behaviour of the time series data is identified in one of the time windows, each element of the time series data in the time window is compared to the respective reconstruction of the reconstructed time series in order to precisely identify the anomalous values in the time window.

In a further embodiment, in the analysing said element of the time series data is marked as anomalous when it is classified as anomalous in predefined number of time windows.

In a further embodiment, the predefined number of time windows is equal to, or greater than, the ratio between the predefined window size and twice the predefined sensitivity level.

In a further embodiment, the Convolutional Autoencoder is defined by a 10-layers deep model.

In a further embodiment, the retrieving is continuously iterated.

In a further embodiment, the extracting defines a plurality of time series samples from the time series data retrieved in a predetermined actual retrieving time window or for a predetermined retrieving amount of data.

In a further embodiment, the predefined window size is equal to 32.

In a further embodiment, the predefined stride is equal to 1.

DETAILED DESCRIPTION OF THE INVENTION

The present invention relates to a method for detecting anomalies in time series data produced by devices of an infrastructure in a network.

The term "time series" relates, in the present invention, to any data of a device in a network that has a timestamp, such as IoT device data. A time series $X=[x_{t_0}, x_{t_1}, \ldots, x_{t_n}]$ is defined as a discrete sequence of data points with an implicit order given by the time $t_i$ at which the point was taken. In most common applications, an assumption is made on the data points being taken at successive equally spaced points in time. However, such assumption does not hold true in respect to IoT and OT devices, meaning that the data points are often produced at irregular intervals of time.

The term "Artificial Neural Networks" or "ANNs" relate, in the present invention, to computing systems based on a series of units, called artificial neurons, connected among themselves. In most common applications the neurons are organized in consecutive layers. In this structure each layer receives a series of values as input and produces an output which is used, with some manipulations, as input for the subsequent layer. The layers are usually denominated Input Layer, the first layer of the ANN wherein its input values are externally provided, Output Layer, the last layer of the ANN wherein its output is used as the prediction for the type of task the network is trying to solve, and Hidden Layers, all the intermediate layers of the network. An important aspect to highlight is that, due to the layered structure of the ANNs, it is possible to disengage from mathematically representing each artificial neuron of the network and treat each layer as a single mathematical object. Given an ANN composed of $N_L$ consecutive layers, it is possible to represent the output of the i-th layer of the network as a function:

$$f_i(\overline{x}_i) = a_i(\lambda(\overline{x}_i, w_i) + \overline{b}_i)$$

where $\overline{x}_i$ is the input of the layer, $w_i$ is a matrix of free parameters called weights, and $\overline{b}_i$ is a bias vector also composed of free parameters. The λ function is the key mathematical operation of the layer, which defines the layer type, thus creating specific types of ANNs. The $a_i$ function is the so-called activation function, whose choice plays a crucial role is the ability of the network to solve a specific task. This representation then allows us to represent an ANN, composed of $N_L$ layers as a set $\mathcal{F}_{\mathcal{N}_L}$:

$$\mathcal{F}_{\mathcal{N}_L} = \{\Theta(\overline{x}), w, \overline{b}\}$$

where $w = \{w_1 \ldots w_{N_L}\}$ and $\overline{b} = \{\overline{b_1}, \ldots, \overline{b_{N_L}}\}$ are respectively the set of all the layer weights and biases and $\Theta(\overline{x})$ is a composition of $f_i(\overline{x}_i)$ functions:

$$\Theta(\overline{x}) = f_{N_L} \circ f_{N_L-1} \circ \ldots \circ f_2 \circ f_1(\overline{x})$$

The term "Autoencoder" relates, in the present invention, to a particular type of ANN whose layers can be grouped in encoder and decoder blocks. The encoder part of the network is used to learn an efficient (compressed) representation of the input data, while the decoder part inflates such encoded representation trying to reconstruct the original network's input.

The term "Convolution Autoencoder" relates, in the present invention, a particular type of Autoencoder composed of Convolutional, Pooling and Upsampling layers. The Convolutional layers perform a discrete convolution of the input values with a series of filters (kernels). Such operation is equivalent to multiplying the input values by the filters using a moving window with a positive defined stride. Padding techniques may be implemented in these type of layers in order to maintain the same dimensionality between the input and the output values. The Pooling layers perform a non-linear down-sampling on the output of a previous layer. More specifically, a Pooling layer divides its input in a series of regions called pools and applies a function to each one of them. The resulting value from all the pools is then combined and used as the output of the layer. The dimensionality of the output of a Pooling layer is typically smaller than its input. The Upsampling layers perform the inverse operation of Pooling layers. Given specific input values, each one is mapped to a pool of values using a particular function. The dimensionality of the output of an upsampling layer is typically larger than its input.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The object of the present invention is to provide a method for detecting anomalies in real-time mode. In particular, the object of the present invention is to provide a method for detecting anomalies of an infrastructure in a network able to recognize any malicious activity in a dynamic way.

In this regard, the method according to the present invention is able to detect anomalies in time series data produced by devices of an infrastructure in a network.

The starting point of the method according to the present invention is a time series produced by a device in a network, in particular by an IoT device or an OT device. Such time series is pre-processed and supplied as input to a Convolutional Autoencoder which reconstructs the input values and its percentiles. Finally, in a further post-processing step the original time series and the reconstructed one are analyzed to identify anomalous behaviors, as described in greater details in the following.

Therefore, the method comprises, for each of the devices, retrieving, by computerized data processing means, a time series data for the device in the network. Such a retrieving can be continuously iterated.

After the retrieving, the method comprises extracting, by the aforementioned computerized data processing means, a plurality of time series samples relating to respective time windows and having a predefined window size and a predefined stride, by sliding the time windows to overlap the time series data. In the preferred embodiment, the extracting defines a plurality of time series samples from the time series data retrieved in a predetermined actual retrieving time window or for a predetermined retrieving amount of data, but different kind of extracting can be used.

Given the time series of a particular device, the first issue to be considered is the absence of a guarantee of such series being long enough to be directly used for the training of a Neural Network. In fact, as stated above, in order for the model to provide a good quality reconstruction of the original time series, a number of training samples at least equal to the number of parameters in the network, namely $N_p$, is required. The known approach would be to divide the time series in a set of statistically independent sub-series of constant length L. This would however require at least $L \cdot N_p$ data points in the time series. The problem of this approach is that it may need huge amount of past data in order to collect enough training samples, making practically impossible to perform anomaly detection for newly deployed devices in a short period of time.

To overcome this issue, in the solution according to the method of the present invention the samples are extracted from the original time series using overlapping sliding time windows having a predefined window size, noted as L in the following, and with a predefined stride. The number of windows generated with this approach is higher than the number of windows generated with the know approach by approximately a factor equal to the time window size itself, allowing a faster activation of the anomaly detection for newly deployed devices. More formally, indicating with $N_S$ and $N_A$ number of samples generated respectively with the known approach and the present inventive approach:

$$N_S = \frac{N}{L} \quad N_A = N - L + 1$$

with N being the time series length. The ratio of these two values is:

$$\frac{N_A}{N_S} = \frac{N-L+1}{\frac{N}{L}} = L\frac{N-L+1}{N} \sim = L$$

The main advantage of this approach is the possibility to shorten the interval of time between the deployment of a new device the infrastructure and the activation of the anomaly detection system. E.g. considering a sensor which produces 1 data point per minute and a model with 1000 parameters and an input size window equal to 32. To enable anomaly detection on the sensor they are need roughly 22 days (32000 data points) with the known approach versus only ~15 hours (~950 data points) using the overlapping sliding time window according to the method of the present invention.

The method of the present invention comprises supplying, by the computerized data processing means, the time series samples as input to a Convolutional Autoencoder to define reconstructed time series values having a predefined percentile intervals.

The architecture described above returns, for each given time window of any device, a reconstructed time series, indicated with $R=[r_1, \ldots, r_L]$, alongside with its 10% and 90% percentiles, respectively indicated with $P^1=[p_1^1, \ldots, p_L^1]$, and $P^9=[p_1^9, \ldots, p_L^9]$.

Preferably, the predefined window size is equal to 32, as being the most suitable value found by the applicant. Furthermore, preferably, the predefined stride is equal to 1, as being the most suitable value found by the applicant. However, before being supplied as input of the Convolutional Autoencoder, the time windows should be mapped to a set of values within a known range.

In this regard, it is possible to supplying the time series samples as such but, according to a preferred embodiment, the method further comprises normalising, through the computerized data processing means, the time series samples to define scaled time series samples before the supplying. Therefore, in the supplying the time series samples are the scaled time series samples as input to a Convolutional Autoencoder.

The normalising can be carried out in a plurality of ways, but according to a preferred embodiment it comprises for each of the time series samples applying a different type of local scaling for the time series timestamps and for the time series values. In particular, the time series are not rescaled as a whole, also known as global scaling, but instead each time window is normalized independently, also known as local scaling.

In fact, unlike the known applications, in the Industrial Control System (ICS) it is not possible to make any prior assumption on the regularity of the intervals at which the values of time series are produced. For this reason, in the method according to the present invention are supplied both the timestamps and the time values as input of the Convolutional Autoencoder. This allows the model to detect not only anomalous behaviors in the values produced by a device but also on the rate at which they are produced. E.g. considering a device whose output is the value x, produced at regular intervals of 1 minute. In case the device changes its behavior and starts producing that same value at different time intervals, such as one value every 2 minutes, the method according to the present invention identifies this as an anomalous behavior. If, on the other hand, it would have considered only the time values produced by the device, ignoring the timestamps, it will be blind to this kind of events.

More specifically, it is applied a different type of local scaling for the timestamps and values of each time window.

Therefore, in the preferred embodiment, the local scaling for the time series timestamps is defined by a normal univariate scaling, namely subtracting the mean and dividing by the standard deviation of the time windows.

Moreover, in the preferred embodiment, the local scaling for the time series values is defined by a max scaling, namely dividing the values of each time window by the maximum value in the window itself.

According to the preferred embodiment, the Convolutional Autoencoder is defined by a 10-layers deep model, but different models can be-used. The architecture proposed for the 10-layers deep model is divided in 4 main parts. The first part is composed by a single layer, also called the input layer, whose role is to receive the input samples, either for the model training, or for the anomaly detection, and forwarding them to the subsequent layers. The second part of the Neural model represents the encoder. The role of this part of the model is to learn and embed the main characteristics of the time widows in a space of smaller dimension with respect to the original one. More in details, the encoder is composed of 2 Convolutional layers. These have respectively 3 and 5 filters of kernel size 10 with stride 1 and symmetric Zero Padding. Alternated to the 2 Convolutional layers the model presents two Pooling layers, used to downsample the input data by perfuming an average pooling operation over a 2×2 kernel. The output of the encoder part of the model is then processed by the decoder. As the name suggests this part of the model inverts the process done by the encoder, bringing the features from a smaller dimensional space to one closer to the original size. More in details, the structure of the decoder is the inverse of the encoder, namely it is composed of 2 Convolutional layers, with respectively 5 and 3 filters of kernel size 10 with stride 1 and symmetric Zero Padding, alternated by 2×2 Upsampling layers. The last part of the model is the so-called output layer which takes as input the output of the decoder and returns the final prediction. The output layer is composed of 3 different and independent Convolutional layers, on the same level. Each of these layers presents a single filter of kernel size 10 with symmetric Zero Padding. The activation function used after each Convolutional layer in the Convolutional Autoencoder architecture according to the present invention is the ELU activation function which, as previously described, is applied to the output values of each layer before forwarding them to the following ones. Moreover, in each Convolutional layer, a Ridge Regularization (L2, as below described in greater details) technique is also implemented in order to stabilize the model and reduce the probability of not being able to correctly reconstruct unseen samples, especially for short time series. Given the overall structure of the Convolutional Autoencoder, a time window of size 32×2 as input translates in 3 vectors of size 32 as output. These vectors are the reconstructed time series value and its 10% and 90% percentile intervals.

Finally, the method according to the present invention comprises analysing, by the computerized data processing means, the reconstructed time series values to identify anomalous behaviors of the time series data, and signalling, by the computerized data processing means, an anomaly of the device when at least one anomalous behavior is identified. Anomalies or Abnormal Behaviors are unexpected changes in the value (or values) and/or time space of a given time series. In the context of IoT and OT devices, an example of such anomaly is a drastic change in the frequency at which data is produced by a sensor and/or in the range of the values themselves.

Preferably, the analysing comprises evaluating an actual overall loss of the Convolutional Autoencoder with respect to an actual retrieving time window identifying the anomalous behaviours of the time series data when the actual overall loss exceeds a predefined threshold level. A Loss function is a function that quantifies how well an ANN is solving the designated task. Such function depends of the input and output values of the ANN and returns a real value, or a set or real values, depending on the specific task. In this regard, regularization is a technique which modifies the loss function of an ANN by taking into account also the internal parameters, namely weights w and biases $\bar{b}$, of the ANN. Two of the know common techniques are L1 and L2 regularization, which respectively add the absolute sum and squared sum of the internal ANN parameters to the original Loss function, modulated by a weight factor.

In particular, the predefined threshold level ($\tau$) is defined in a learning phase with respect to a learning retrieving time window, as:

$$\tau = \mu + \frac{\sigma}{s}$$

wherein
- $\mu$ is the mean of the learning overall loss of the Convolutional Autoencoder;
- $\sigma$ is the standard deviation of the learning overall loss;
- $s$ is a predefined sensitivity level.

The learning phase corresponds to the ANN training, which is an algorithmic procedure whose goal is to minimize the value of a Loss function. This is done by estimating the optimal w and $\bar{b}$ parameters that minimizes such Loss. One common example of such algorithm is Backpropagation, an iterative algorithm which, at each iteration, updates the network parameters using an optimization algorithm.

The Convolutional Autoencoder is trained using the time windows generated with the previously described methodology and the optimization algorithm described in "*Adam: A Method for Stochastic Optimization*", Diederik P. Kingma, Jimmy Ba, arXiv:1412.6980, which is here incorporated by reference. Specific losses are computed for each component of the output layer (expected value, 10% percentile, 90% percentile). More in details, for a given time window of size L, the Loss computed for the reconstructed values corresponds to the mean average reconstruction error of the time window while, for the percentiles, it is possible to take into account its 0.1 and 0.9 quantiles. Starting from these 3 losses, an overall loss used by the Backpropagation algorithm is computed. It is possible to define such loss as a linear combination of the aforementioned 3 losses together with L2 regularization, weighted as follows:
- 1 for the reconstructed value loss;
- 0.5 for each percentile loss;
- $2 \cdot 10^{-5}$ for the L2 regularization.

Finally, once the training is completed, it is possible to compute $\mu$ and $\sigma$ as the mean and standard deviation of such overall losses respectively. Once the training is completed and the system is enabled, it is possible to perform such analysis. To do so, given a time window $W=[w_1, \ldots, w_L]$ of newly produced samples, the following four parameters are taken into account:

$l_w$ is the overall loss of the model reconstruction with respect to the input time window W;

μ and σ as previously calculated at the very end of the model training phase described above;

s is the predefined sensitivity level, which is the sensitivity level chosen by the infrastructure owner.

These four parameters are used to decide whether a time window should be marked as potentially anomalous. In particular, given the threshold τ, if the reconstruction loss for the time window W exceeds the threshold level, $l_w>\tau$, the window is marked as anomalous. Otherwise, if the reconstruction loss for the time window W is within the threshold boundaries, $l_w\leq\tau$, the window is considered as non anomalous.

If marked as anomalous, each element of the time window i is compared to its reconstruction in order to precisely identify the anomalous value(s) in the time window. Such comparison is performed as follows:

For i from 1 to L.

If $w_i>q_i^9$ or $w_i<q_i^1$ then $w_i$ is an anomalous point

Taking into account the previously described Convolutional Autoencoder, despite being preferably 10-layers deep, the structure of the network is specifically designed to be lightweight. Given the specifics above, the total number of parameters roughly amounts to ~720. This brings several benefits. The model can be trained in a short amount of time and therefore allows, given enough collected data, for an almost immediate activation of the system for any specific device regardless of the time at which the device has been installed in the infrastructure. The model can process each and every sample in real-time even when running on low-end hardware. It is computationally and economically inexpensive to instantiate a model for each device in the infrastructure.

According to the preferred embodiment, in the analysing when the anomalous behaviours of the time series data is identified in one of the time windows, each element of the time series data in the time window is compared to the respective reconstruction of the reconstructed time series in order to precisely identify the anomalous values in the time window.

Preferably, in the analysing said element of the time series data is marked as anomalous when it is classified as anomalous in predefined number of time windows. More preferably, the predefined number of time windows is equal to, or greater than, the ratio between the predefined window size and twice the predefined sensitivity level. Given the sliding window based processing, at regime, each element in a time series stream is processed L times. Therefore, as above described, to reduce false-positives, an element is marked as anomalous if and only if it is classified as anomalous in more than $$\frac{L}{2s}$$

The present invention therefore provides a method for detecting anomalies in time series data produced by devices of an infrastructure in a network able to define a pipeline for efficiently and effectively detecting anomalous behaviors in time series data produced by OT and/or IoT devices within any industrial system.

The invention defines the topology of a Convolutional Autoencoder capable of learning the specific behavior of a generic device, by encoding the time series data and then reconstructing it. The reconstructed time series is then analysed and used to detect anomalies by comparing it with the ground-truth, represented by the data streamed by the device itself.

In particular, by the use of Artificial Neural Networks it is possible to learn, analyze, and reproduce patterns that are invisible to the human eye and, for this reason, such technology can be effectively applied to the task of reconstructing and modelling time series streams and detecting anomalies of the present invention.

The invention claimed is:

1. A method for detecting anomalies in time series data produced by devices of an infrastructure in a network comprising, for each of said devices:

retrieving, by computerized data processing means, a time series data for said device in said network;

extracting, by said computerized data processing means, a plurality of time series samples relating to respective time windows and having a predefined window size and a predefined stride, by sliding said time windows to overlap said time series data;

supplying, by said computerized data processing means, said time series samples as input to a Convolutional Autoencoder to define reconstructed time series values having a predefined percentile intervals;

analysing, by said computerized data processing means, said reconstructed time series values to identify anomalous behaviours of said time series data;

signalling, by said computerized data processing means, an anomaly of said device when at least one of said anomalous behaviour is identified; wherein said analysing comprising evaluating an actual overall loss of said Convolutional Autoencoder with respect to an actual retrieving time window identifying said anomalous behaviours of said time series data when said actual overall loss exceeds a predefined threshold level, wherein, in said analysing when said anomalous behaviour of said time series data is identified in one of said time windows, each element of said time series data in said time window is compared to the respective reconstruction of said reconstructed time series in order to precisely identify the anomalous values in said time window, and wherein in said analysing said element of said time series data is marked as anomalous when it is classified as anomalous in predefined number of time windows.

2. The method for detecting anomalies in time series data produced by devices of an infrastructure in a network according to claim 1, wherein said method further comprises normalising, through said computerized data processing means, said time series samples to define scaled time series samples before said supplying, and wherein in said supplying said time series samples are said scaled time series samples as input to a Convolutional Autoencoder.

3. The method for detecting anomalies in time series data produced by devices of an infrastructure in a network according to claim 2, wherein said normalising comprises for each of said time series samples applying a different type of local scaling for time series timestamps, said time series timestamps being defined as timestamps of each respective time series values, and for time series values, said time series values being defined as values of each respective samples.

4. The method for detecting anomalies in time series data produced by devices of an infrastructure in a network according to claim 3, wherein said local scaling for said time series timestamps is defined by a normal univariate scaling.

5. The method for detecting anomalies in time series data produced by devices of an infrastructure in a network according to claim 3, wherein said local scaling for said time series values is defined by a max scaling.

6. The method for detecting anomalies in time series data produced by devices of an infrastructure in a network according to claim 1, wherein said predefined threshold level ($\tau$) is defined in a learning phase with respect to a learning retrieving time window, as:

$$\tau = \mu + \frac{\sigma}{s}$$

wherein,
- $\mu$ is the mean of the learning overall loss of said Convolutional Autoencoder;
- $\sigma$ is the standard deviation of said learning overall loss; and,
- s is a predefined sensitivity level.

7. The method for detecting anomalies in time series data produced by devices of an infrastructure in a network according to claim 1, wherein said predefined number of time windows is equal to, or greater than, the ratio between said predefined window size and twice the predefined sensitivity level.

8. The method for detecting anomalies in time series data produced by devices of an infrastructure in a network according to claim 1, wherein said Convolutional Autoencoder is defined by a 10-layers deep model.

9. The method for detecting anomalies in time series data produced by devices of an infrastructure in a network according to claim 1, wherein said retrieving is continuously iterated.

10. The method for detecting anomalies in time series data produced by devices of an infrastructure in a network according to claim 1, wherein said extracting defines a plurality of time series samples from said time series data retrieved in a predetermined actual retrieving time window or for a predetermined retrieving amount of data.

11. The method for detecting anomalies in time series data produced by devices of an infrastructure in a network according to claim 1, wherein said predefined window size is equal to 32.

12. The method for detecting anomalies in time series data produced by devices of an infrastructure in a network according to claim 1, wherein said predefined stride is equal to 1.

* * * * *